Nov. 30, 1926.
T. C. MARK
1,608,897
DETACHABLE DISPENSING TOP AND HANDLE FOR VESSELS
Filed Feb. 25, 1926
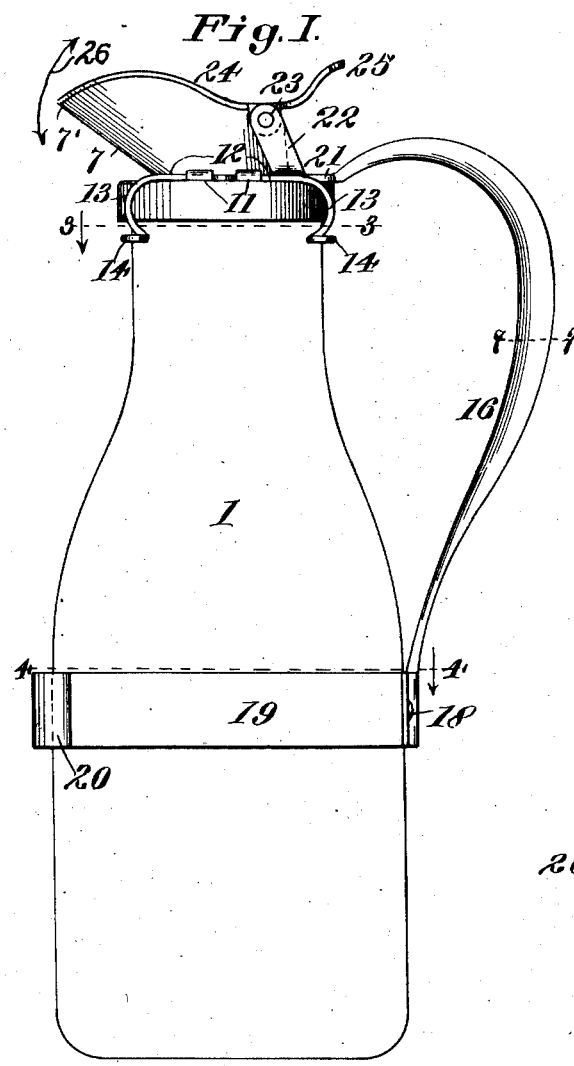
Fig. 1.
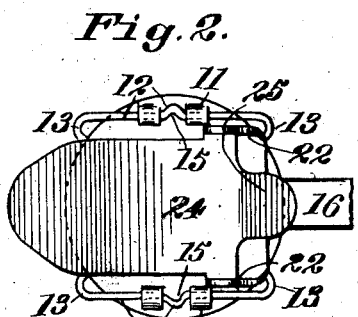
Fig. 2.
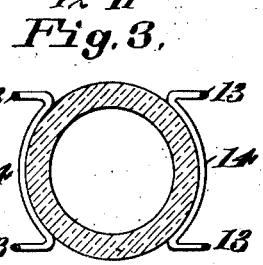
Fig. 3.
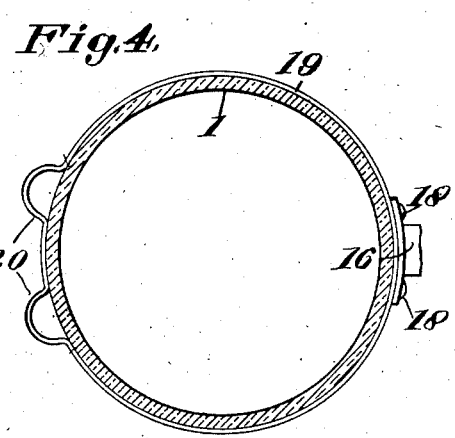
Fig. 4.
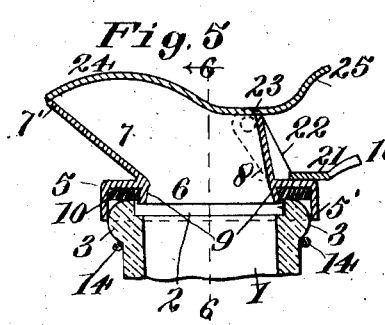
Fig. 5.
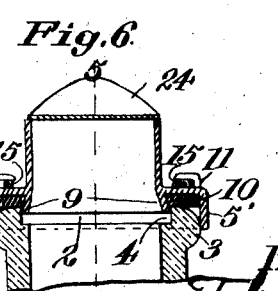
Fig. 6.
Fig. 7.
Inventor,
Thomas C. Mark
By Harry A. Toi
Attorney Patented Nov. 30, 1926.

1,608,897

UNITED STATES PATENT OFFICE.

THOMAS C. MARK, OF RICHMOND, CALIFORNIA.

DETACHABLE DISPENSING TOP AND HANDLE FOR VESSELS.

Application filed February 25, 1926. Serial No. 90,494.

The present invention relates to a dispensing spout structure designed for attachment to and removal from a container or vessel of the well known type, as for example, the conventional milk bottle, and the present invention may or may not have incorporated with it a supporting handle to facilitate the tipping of the vessel or container to discharge the contents thereof through the dispensing spout.

The invention has for one of its objects to provide a dispensing spout structure for bottles, particularly milk bottles, which is provided with yieldable means for frictionally engaging the bead at the bottle mouth to detachably hold the spout structure thereon; to provide a spout structure having a packing member for resting on the bottle mouth material to preclue a leaky joint between the spout structure and the bottle mouth; to provide a spout structure wherein the spring retaining means and the packing member are adapted for detachment from the structure when it is desired to renew the same or sterilize the structure for sanitary reasons.

Further objects are to provide in connection with the spout structure a vessel or container handle which is also removable with the spout structure and when in position affords a safe and secure means for tipping the vessel or container to discharge the contents therefrom; to provide a handle structure which is held to the vessel or container by an expansible yielding means for engaging the vessel or container body, the handle structure being preferably pivotally connected to the dispensing spout structure to preclude the pivotal movement of the spout structure in one direction and to admit of free movement of the spout structure in another direction when it is desired to position the structure on to and remove the same from the container or vessel mouth.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Fig. 1 is a view in elevation of one embodiment of my invention as applied to the conventional milk bottle.

Fig. 2 is a view in top plan illustrating the spring retainer means mounted on the cap.

Fig. 3 is a transverse sectional view on line 3—3 of Fig. 1.

Fig. 4 is a transverse sectional view on line 4—4 of Fig. 1 illustrating particularly the means for detachably securing the lower end of the handle to the body of the vessel.

Fig. 5 is a vertical sectional view on line 5—5 of Fig. 6 illustrating particularly the fulcrum connection for the spout cover and the forked portion of the handle and the portion of the handle resting on the flat surface of the cap.

Fig. 6 is a similar view taken on line 6—6 of Fig. 5 illustrating particularly the bosses beneath which spring retaining means are detachably held to the cap.

Fig. 7 is a transverse sectional view on line 7—7 of Fig. 1 illustrating the cross sectional contour of the handle.

In the drawings wherein like characters of reference designate corresponding parts throughout the several views, the numeral 1 refers to a vessel or container illustrated as of the conventional milk bottle type provided with a mouth 2 surrounded by a bead 3, the inner wall of which is formed with a closure cap receiving depression 4.

5 indicates the peripherally flanged cap of the spout structure formed with an opening 6 therethrough, and from which rise the spout forming walls 7 and 8, the end 7' of the wall 7 constituting a pouring spout or lip for directing the contents on the tipping of the vessel. The inner end of the walls 7 and 8 extends through the opening 6 constituting a flange 9 inclined toward the peripheral flange 5' of the cap. Between the flanges 9 and 5' is adapted for reception a packing 10 preferably of rubber or other yieldable material, the same resting on the upper peripheral edge of the vessel or container mouth, as in Figs. 5 and 6 of the drawing, and with the flange 9 projecting into the recess 4. On opposite sides of its upper surface, the cap 5 is provided with the upwardly and inwardly extending bosses 11 beneath which are adapted for removable reception the opposing parallel spring portions 12 of the yieldable head engaging means, said portions at their ends being downwardly curved at 13 and bent to provide parallel portions 14 disposed at right angles to the portions 12 in a horizontal plane below the same. The portions 12 within their length are arcuately bent as at 15 to afford portions lying between adjacent lugs 11 to preclude longitudinal movement of the spring portions relatively to the cap 5.

It will be observed that the spring portions 14 are lineally curved, and when the spout structure is detachably positioned over the vessel or container mouth said portions 14 engage beneath the bead 3 thereof and detachably hold the spout structure thereto.

To facilitate the pouring of the contents of the vessel or container from the spout structure, I prefer to incorporate in connection with the structure a handle 16 preferably of strap material concave transversely as at 17, Fig. 7, the lower end of which is secured as at 18 to a band 19 of suitable material of a size to encircle the body of the vessel or container.

To compensate for variations in the diameter of the body of the vessel or container to ensure a relatively tight gripping thereof the band 19 is formed with expansible portions 20 in the form of outwardly extended curved portions. The upper end of the handle 16 is provided with a portion 21, Figs. 1 and 5, disposed in a plane to lie on and in contact with the upper surface of the cap 5 when the parts are in the position on the vessel or receptacle as in Fig. 1. The terminal end of the handle is forked providing arms 22, one extending upwardly on each side of the wall 8 and fulcrumed to the upper portion of the wall as at 23, the fulcrum point also providing a point of fulcrum for a closure 24 overlying the discharge end of the spout, said closure 24 being provided with a thumb lift 25 overlying the upper end of the handle 16. It will be observed that the portion 21 of the handle contacting with the upper surface of the cap 5 precludes the pivotal movement of the cap in one direction, but enables the free movement of the cap in another direction to admit of the same being applied to and removed from the vessel mouth by an arcuate movement as illustrated by the arrow 26, Fig. 1.

In detachably securing the structure to a vessel of the conventional milk bottle type, the band 19 is slipped downwardly over the body of the bottle, and with the cap 5 in a tilted position, and the rear spring member 14 lying substantially beneath a portion of the bead 3, the downward pivotal movement is imparted to the cap in the direction of the lower arrow head 26 until such time as the forward spring member 14 engages beneath its portion of the bead 3. When in this position, the structure is detachably secured to the vessel and to remove the same a reversal of the operation as above described is only necessary.

I claim :—

1. A dispensing spout and supporting handle for vessels or containers comprising a cap for resting on the upper edge of the vessel mouth, said cap being provided with a controllable pouring spout, yieldable cap retaining means carried by the cap for engaging the exterior of the vessel below its mouth, a handle pivotally connected with the cap and provided with means for yieldably gripping the body of the vessel, said handle near its pivotal connection bearing on said cap to limit the relative pivotal movement of the cap and handle in one direction to position the cap and handle in operative relation with respect to each other on a vessel.

2. A dispensing spout structure for beaded mouth vessels comprising a cap for resting on the vessel mouth wall, spring means depending from the cap for yieldably engaging the vessel bead to detachably hold a cap thereon, a spout extending upwardly from the cap and communicating through an opening in the same with the interior of the vessel, a handle extending outwardly and downwardly from the cap, said handle at its upper end being forked to provide portions extending one on either side of the spout, a fulcrum connection between the forked portions and the spout wall, said handle at the base of said fork resting on said cap to limit the pivotal movement of the cap in one direction, and yieldable vessel encircling means secured to the lower end of the handle.

3. A dispensing spout structure for beaded mouth containers comprising a spout assembly formed to fit said containers, and means for securing said assembly to a container having a single resilient member formed to provide opposed parallel spring portions arranged in different horizontal planes at right angles to each other, the upper of said parallel portions being secured to said assembly.

4. A dispensing spout structure for beaded mouth containers comprising a spout assembly formed to fit the ends of said containers, means for securing said assembly to a container having a single resilient member formed to provide opposed parallel spring portions arranged in different horizontal planes at right angles to each other, and means on said assembly for removably receiving and retaining the upper parallel portions in engagement therewith in cooperation with the resiliency of the member.

In testimony whereof I have signed my name to this specification.

THOMAS C. MARK.